(12) United States Patent
Horn et al.

(10) Patent No.: US 11,557,321 B2
(45) Date of Patent: *Jan. 17, 2023

(54) DATA STORAGE DEVICE DUPLICATING AN ECC SUB-BLOCK IN DOWNSTREAM ECC SUPER-BLOCK

(71) Applicant: Western Digital Technologies, Inc., San Jose, CA (US)

(72) Inventors: Robert L. Horn, Yorba Linda, CA (US); Derrick E. Burton, Ladera Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,783

(22) Filed: Dec. 10, 2021

(65) Prior Publication Data
US 2022/0366938 A1  Nov. 17, 2022

Related U.S. Application Data

(63) Continuation of application No. 17/316,981, filed on May 11, 2021, now Pat. No. 11,211,094.

(51) Int. Cl.
*G11B 20/18* (2006.01)
*G11B 5/008* (2006.01)

(52) U.S. Cl.
CPC ...... *G11B 20/1833* (2013.01); *G11B 5/00813* (2013.01)

(58) Field of Classification Search
None
See application file for complete search history.

(56) References Cited

U.S. PATENT DOCUMENTS

| 5,311,521 | A | * | 5/1994 | Fitingof | G11B 20/1426 |
| 5,442,638 | A | * | 8/1995 | Awad | G11B 20/1883 |
| 5,475,542 | A | * | 12/1995 | Bentley | G11B 5/09 |
| 5,677,900 | A | * | 10/1997 | Nishida | G11B 20/1209 |
| 5,841,600 | A |   | 11/1998 | Kaplan | |
| 5,946,328 | A | * | 8/1999 | Cox | H03M 13/29 714/756 |

(Continued)

FOREIGN PATENT DOCUMENTS

EP          0127732 B1 * 12/1984

*Primary Examiner* — Peter Vincent Agustin
(74) *Attorney, Agent, or Firm* — Patterson & Sheridan, LLP; Steven H. VerSteeg

(57) ABSTRACT

A data storage device configured to access a magnetic tape is disclosed, wherein the data storage device comprises at least one head configured to access the magnetic tape. A first plurality of data blocks are encoded into a first plurality of ECC sub-blocks including a first ECC sub-block, and the first plurality of ECC sub-blocks are encoded into a first ECC super-block. The first ECC sub-block is written to the magnetic tape, and a write-verify of the first ECC sub-block is executed by reading the first ECC sub-block. When the write-verify passes, a second plurality of data blocks are encoded into a second ECC super-block, and when the write-verify fails, a third plurality of data blocks and the first ECC sub-block are encoded into the second ECC super-block, wherein the second ECC super-block is written to the magnetic tape.

18 Claims, 5 Drawing Sheets

(56) References Cited

U.S. PATENT DOCUMENTS

| | | | |
|---|---|---|---|
| 6,175,891 B1* | 1/2001 | Norman | G06F 12/0661 |
| | | | 711/E12.086 |
| 6,608,730 B1* | 8/2003 | Gill | G11B 15/1875 |
| 7,440,212 B2 | 10/2008 | Saliba | |
| 8,495,470 B2 | 7/2013 | Cideciyan et al. | |
| 8,825,977 B1 | 9/2014 | Syu et al. | |
| 9,823,863 B1* | 11/2017 | Lu | G06F 3/0619 |
| 11,049,520 B1* | 6/2021 | Galbraith | G11B 5/00813 |
| 11,211,094 B1* | 12/2021 | Horn | G11B 20/1833 |
| 2008/0082862 A1* | 4/2008 | Martens | G11B 20/1879 |
| | | | 714/18 |
| 2008/0284624 A1* | 11/2008 | Cideciyan | G11B 20/1426 |
| | | | 341/59 |
| 2009/0158125 A1* | 6/2009 | Harada | G11B 20/1833 |
| | | | 714/763 |
| 2012/0023384 A1* | 1/2012 | Naradasi | G06F 11/1012 |
| | | | 714/763 |
| 2012/0110417 A1* | 5/2012 | D'Abreu | G06F 11/1012 |
| | | | 714/763 |
| 2012/0224465 A1* | 9/2012 | Akahoshi | G11B 20/1879 |
| 2021/0303185 A1* | 9/2021 | Mishra | G06F 3/061 |

* cited by examiner

DATA STORAGE DEVICE DUPLICATING AN ECC SUB-BLOCK IN DOWNSTREAM ECC SUPER-BLOCK

CROSS-REFERENCE TO RELATED APPLICATIONS

This application is a continuation of co-pending U.S. patent application Ser. No. 17/316,981, filed May 11, 2021, which is related to U.S. patent application Ser. No. 16/870,658, filed on May 8, 2020, entitled "DATA STORAGE DEVICE EMPLOYING MULTI-TIER CODING FOR MAGNETIC TAPE," each of which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 2A shows an embodiment wherein host blocks are encoded into ECC sub-blocks, and a plurality of the ECC sub-blocks are encoded into an ECC super-block written to the magnetic tape.

FIG. 2B shows an embodiment wherein when an ECC sub-block fails a write-verify while writing a first ECC super-block, the ECC sub-block is duplicated in a second ECC super-block.

FIG. 2C shows an embodiment wherein when a duplicated ECC sub-block is recovered from reading the second ECC super-block, the recovered ECC sub-block is used to recover the first ECC super-block.

DETAILED DESCRIPTION

Figure 1A:
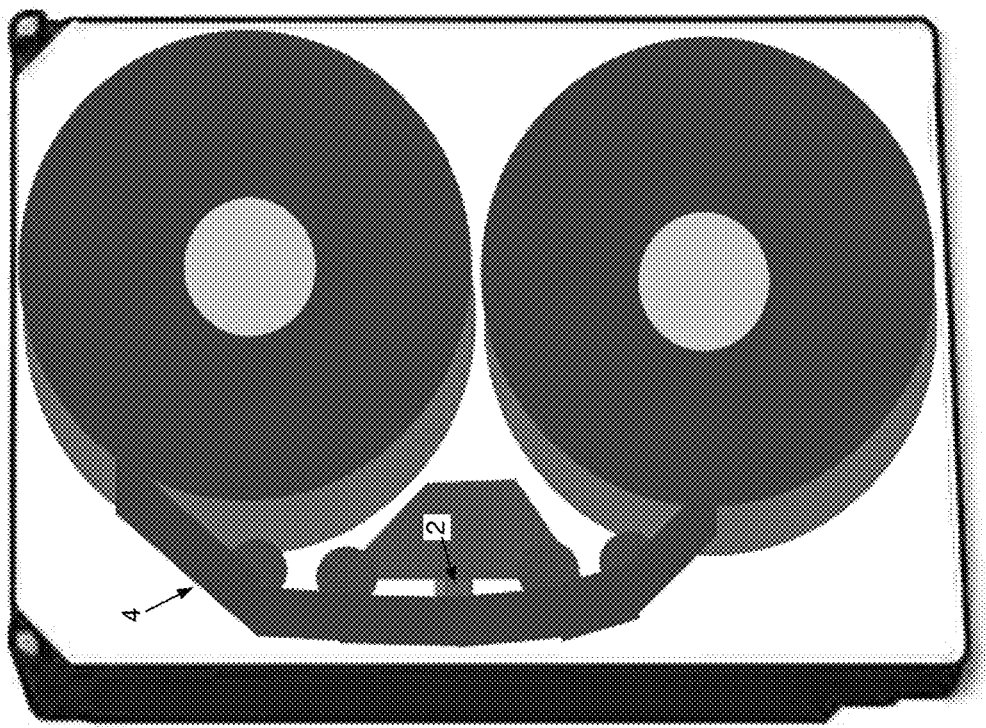
FIG. 1A shows a data storage device according to an embodiment comprising at least one head configured to access a magnetic tape.
Figure 1B:
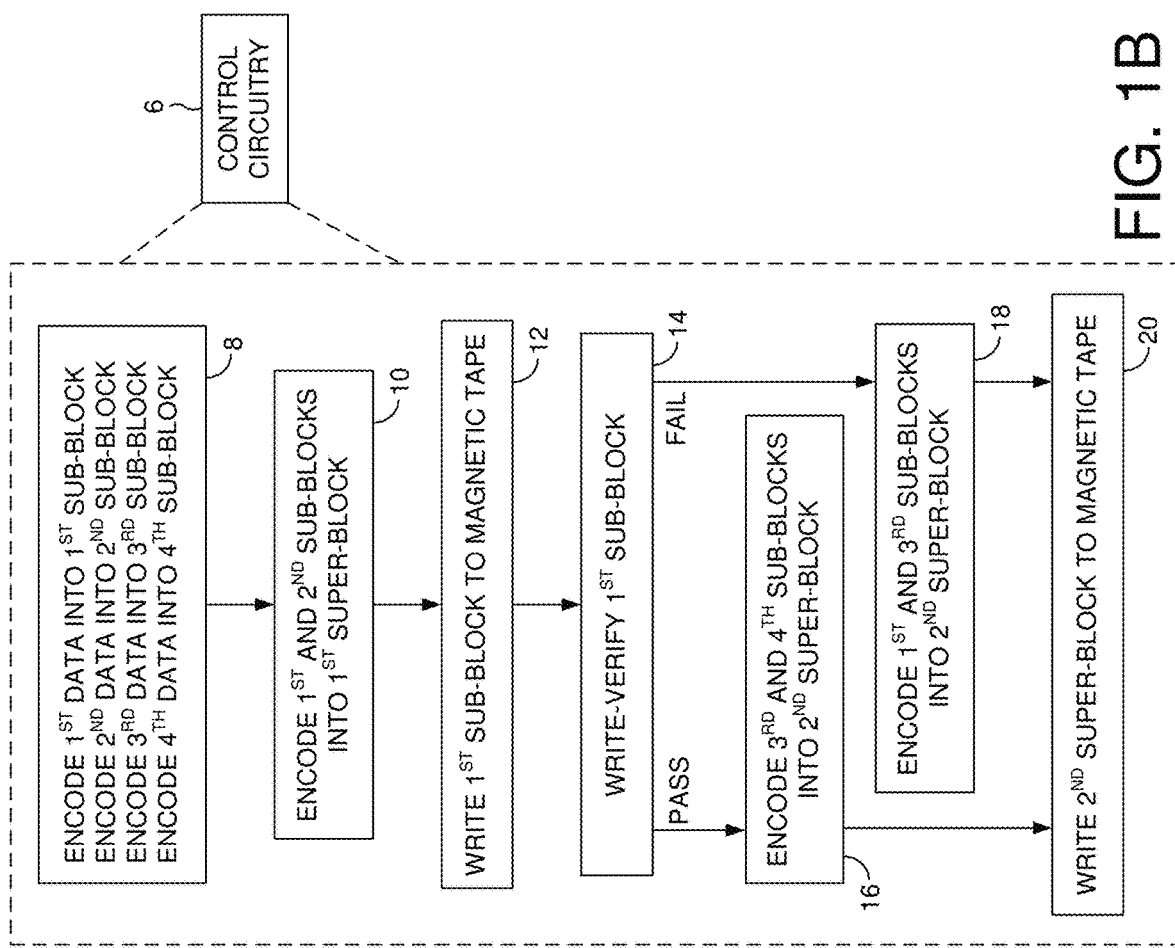
FIG. 1B is a flow diagram according to an embodiment wherein when an ECC sub-block fails a write-verify, the ECC sub-block is duplicated in a downstream ECC super-block.

FIG. 1A shows a data storage device according to an embodiment comprising at least one head 2 configured to access a magnetic tape 4 and control circuitry 6 configured to execute the flow diagram of FIG. 1B. A first data block is encoded into a first error correction code (ECC) sub-block, a second data block is encoded into a second ECC sub-block, a third data block is encoded into a third ECC sub-block, and a fourth data block is encoded into a fourth ECC sub-block (block 8). The first and second ECC sub-blocks are encoded into a first ECC super-block (block 10). The first ECC sub-block is written to the magnetic tape (block 12), and a write-verify is executed by reading the first ECC sub-block (block 14). When the write-verify passes, the third and fourth ECC sub-blocks are encoded into a second ECC super-block (block 16), and when the write-verify fails, the first and third ECC sub-blocks are encoded into the second ECC super-block (block 18), wherein the second ECC super-block is written to the magnetic tape (block 20).

Figure 1C:
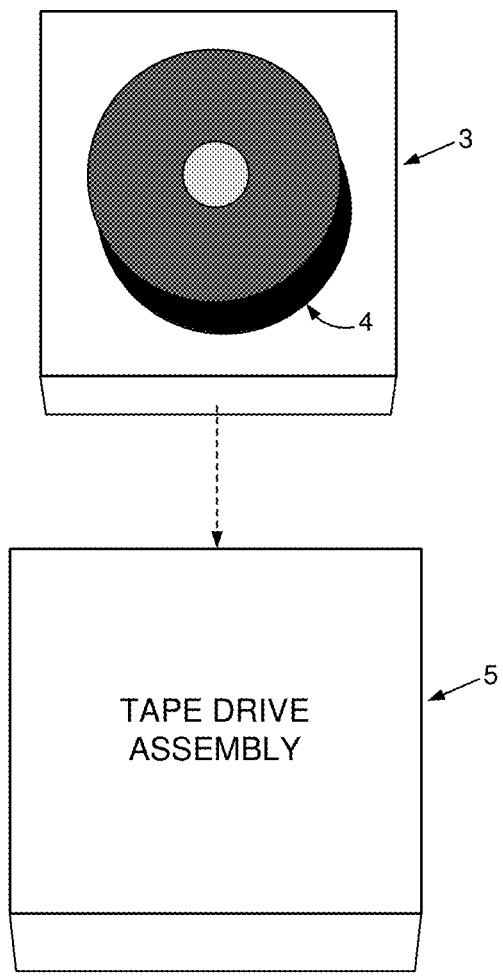
FIG. 1C shows an embodiment wherein the data storage device comprises a tape drive assembly configured to access a magnetic tape housed in a cartridge assembly.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1C, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry configured to execute the flow diagram of FIG. 1B. In the embodiment of FIG. 1C, the magnetic tape 4 is wound around a single reel which may also be employed in the embodiment of FIG. 1A.

In one embodiment, the tape drive may comprise a head bar having an array of write/read elements configured to concurrently write/read a plurality of corresponding data tracks. In addition, the read elements of the head bar may be used to execute a write-verify operation wherein an ECC sub-block written to the magnetic tape may be read from the magnetic tape during the write pass to verify its recoverability. In this manner when an ECC sub-block written as part of a first ECC super-block fails the write-verify operation, the ECC sub-block may be duplicated in a second (downstream) ECC super-block.

Figures 2A, 2B, 2C:
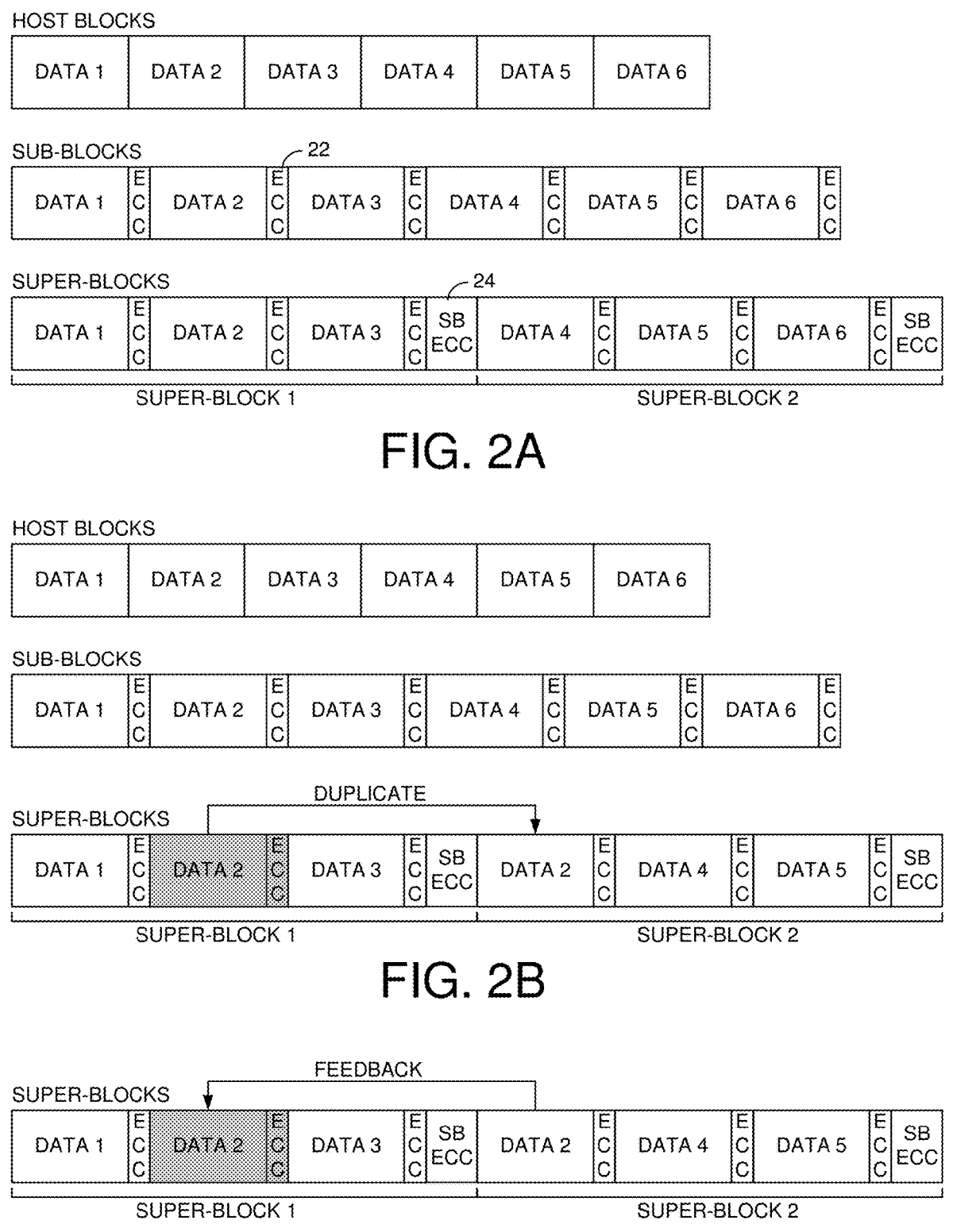

FIG. 2A shows an embodiment wherein a number of host blocks (DATA 1, DATA 2, DATA 3, etc.) are encoded into corresponding ECC sub-blocks using any suitable ECC coding algorithm. A plurality of the ECC sub-blocks (three in this example) are then encoded into an ECC super-block which is written to the magnetic tape. In the example of FIG. 2A, the ECC encoding that generates an ECC sub-block is shown as appending ECC symbols 22 to the end of each data block, and similarly the ECC encoding that generates an ECC super-block is shown as appending ECC symbols 24 to the end of a plurality of the ECC sub-blocks. In other embodiments, the ECC symbols may be embedded within an ECC sub-block and/or embedded within an ECC superblock. An example ECC encoding that embeds ECC symbols within a block is a low density parity check (LDPC) code which may be used to encode the host data into an ECC sub-block. For example, in one embodiment an ECC sub-block may comprise a plurality of LDPC codewords each having embedded ECC symbols. In one embodiment, an ECC super-block may be a "M blocks parity" which is a parity block generated over a number M of the ECC sub-blocks. Further details of this embodiment are disclosed in the above referenced U.S. patent application entitled "DATA STORAGE DEVICE EMPLOYING MULTI-TIER CODING FOR MAGNETIC TAPE." In another embodiment, an ECC sub-block may be generated as an "M blocks parity," and an ECC super-block may be generated as an erasure code generated over a plurality of the "M blocks parity."

In the example of FIG. 2A, a first and second ECC super-blocks are written to the magnetic media with each of the ECC sub-blocks passing the write-verify during the write operation. FIG. 2B shows an example where the second ECC sub-block in the first ECC super-block fails the write-verify (designated as a shaded ECC sub-block). Accordingly in this embodiment, the second ECC sub-block is duplicated by encoding the second ECC sub-block into the following ECC super-block. That is, instead of encoding the host data blocks 4, 5, and 6 into the second ECC super-block as shown in FIG. 2A, in FIG. 2B the host data blocks 2, 4, and 5 are encoded into the second ECC super-block (data block 6 is pushed down into the following ECC super-block). During a read operation, the first copy of data block 2 may remain unrecoverable when reading the first ECC super-block (i.e., the ECC super-block may be unable to recover the ECC sub-block). However, in this example the duplicate copy of data block 2 in the second ECC super-block is recoverable (using the ECC from the sub-block or the super-block if needed). In one embodiment, the control circuitry 6 maintains the sequence of ECC sub-blocks written to the magnetic tape so that the sequence can be reconstructed during a read operation. For example, the control circuitry 6 may maintain a mapping table or write a sequence number (e.g., a logical address) in a header of each ECC sub-block. In one embodiment the data block 2 in the first ECC super-block of FIG. 2B may be recoverable during a read operation (e.g., using the ECC of the super-block) such that when the duplicate of data block 2 in the second ECC super-block is read it can be identified as a duplicate and discarded.

FIG. 2C shows an example wherein the first copy of data block 2 in the first ECC super-block may be unrecoverable during a read operation together with at least one other ECC sub-block within the first ECC super-block (e.g., data block 1 or 3). That is, in one embodiment the number of errors in the first copy of data block 2 and at least one other ECC sub-block may exceed the correction capability of both the ECC sub-block and the ECC super-block. Accordingly when the duplicate of data block 2 is successfully recovered from the second ECC super-block, in one embodiment the duplicate of data block 2 may be used as feedback to decode the first ECC super-block. That is, when the first unrecoverable copy of data block 2 is replaced with the duplicate copy, it may enable the first ECC super-block to decode the other remaining ECC sub-blocks (e.g., data block 1 or 3) in the first ECC super-block.

Figure 3A:
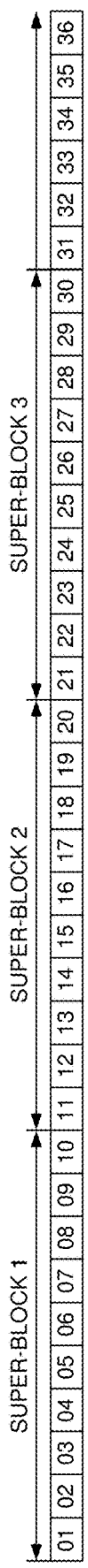
FIG. 3A shows an embodiment wherein ten ECC sub-blocks are encoded into each ECC super-block.
Figure 3B:
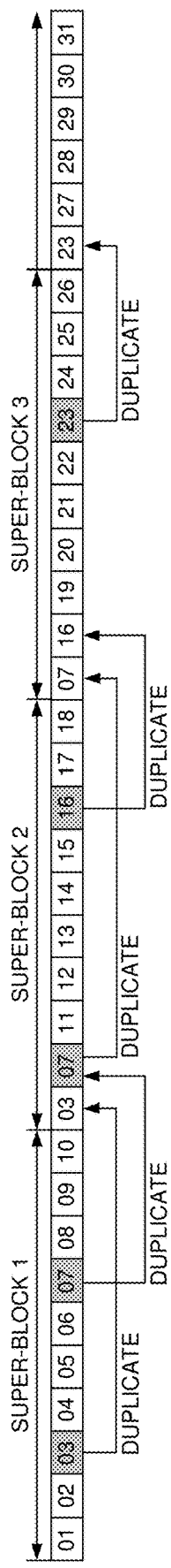
FIG. 3B shows an example wherein multiple ECC sub-blocks that fail the write-verify are duplicated in a downstream ECC super-block.
Figure 3C:
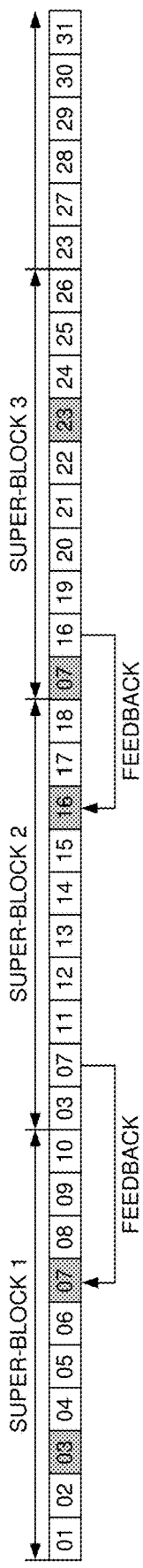
FIG. 3C shows an example wherein upstream ECC super-blocks may be recovered by cascading feedback from duplicated ECC sub-blocks in downstream ECC super-blocks.

Any suitable number of ECC sub-blocks may be encoded into an ECC super-block, wherein increasing the number of ECC sub-blocks may increase the format efficiency of the magnetic tape but may decrease performance (e.g., in terms of correction power and corresponding throughput during read operations). FIG. 3A shows an embodiment wherein ten ECC sub-blocks are encoded into each ECC super-block, wherein in the example of FIG. 3A all of the ECC sub-blocks pass the write-verify during the write operation. In the example of FIG. 3B, the shaded ECC sub-blocks fail the write verify operation and are therefore duplicated in a downstream ECC super-block (e.g., the following ECC super-block). FIG. 3C shows an embodiment wherein during a read operation, when a duplicate ECC sub-block is successfully recovered from a downstream ECC super-block, the duplicate may be used as feedback to recover an upstream ECC super-block, and this process may cascade to further upstream ECC super-blocks. For example, when data block 16 is recovered from ECC super-block 3 it may be used as feedback to decode ECC super-block 2 as shown in FIG. 3C. If ECC super-block 2 is successfully decoded using this feedback, it means previously unrecovered data block 07 is recovered. Accordingly, the recovered data block 07 may be used as feedback to decode ECC super-block 1 as shown in FIG. 3C. In one embodiment, duplicating ECC sub-blocks downstream and then feeding back the duplicated ECC sub-blocks during a read operation improves the performance of the tape drive in terms of format efficiency by enabling a greater number of ECC sub-blocks to be encoded into an ECC super-block while maintaining a desired throughput performance as compared to a system that does not employ feedback.

Figure 3D:
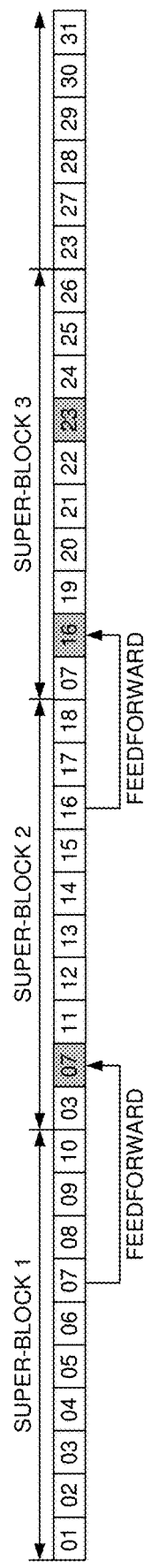
FIG. 3D shows an example wherein a downstream ECC super-block may be recovered using feedforward from a duplicated ECC sub-block in an upstream ECC superblock.

FIG. 3D shows an embodiment wherein when a copy of an ECC sub-block is successfully recovered it may be used as feedforward to decode a downstream ECC super-block (which may also cascade further downstream similar to the cascaded feedback embodiment described above). For example, when reading ECC super-block 1 the first copy of data block 07 may be recovered and used as feedforward to decode ECC super-block 2 (when the duplicate data block 07 is unrecoverable by the corresponding ECC sub-block). When ECC super-block 2 is successfully decoded, the recovered data block 16 may be used as feedforward to decode ECC super-block 3 and so on.

Referring again to the example of FIG. 3C, when using a copy of a data block as feedback the position within the upstream ECC super-block to insert the copy can be determined based on the sequence numbers. For example, when the copy of data block 07 in ECC super-block 2 is recovered it can be used as feedback into ECC super-block 1 at the position corresponding to data block 07. When using a recovered data block as feedforward to recover a downstream ECC super-block, in one embodiment the data block in the upstream ECC super-block may be inferred. Referring to the example of FIG. 3D, it can be determined from the gap in the sequence numbers that the first two data blocks in ECC super-block 2 are copies from ECC super-block 1. However, in one embodiment it may not be known which data block was copied from ECC super-block 1. For example, if when reading ECC super-block 2 data block 07 cannot be recovered, it can be determined that the location stores a copied data block from ECC super-block 1 from the gap in the sequence numbers, but which data block was copied may be indeterminate. Accordingly in one embodiment, it may be inferred that the lowest quality data block from the upstream ECC super-block was copied into the downstream ECC super-block. For example when reading ECC super-block 1 in FIG. 3D, data block 07 may be unrecoverable at the ECC sub-block level but recovered at the ECC super-block level. Therefore it may be inferred that data block 07 was copied into the downstream ECC super-block 2. In the case were all of the data blocks are recovered at the ECC sub-block level when reading ECC super-block 1, the lowest quality data block (e.g., the data block having the most bit errors or maximum number of decoding iterations) may be inferred as the data block copied into the downstream ECC super-block 2. In another embodiment, multiple attempts to recover the downstream ECC super-block 2 may be attempted using feedforward by trying different data blocks from the upstream ECC super-block 1. That is, a first attempt may be made using the lowest quality data block, a second attempt using the next lowest quality data block, and so on. In yet another embodiment, each ECC super-block may be recorded with metadata (e.g., in a header) that identifies the sequence of data blocks contained therein, including any data blocks copied from upstream ECC super-block(s). In this embodiment, the metadata can be used to select which data blocks to feedforward from an upstream ECC super-block for use in decoding a downstream ECC super-block.

Figure 4:
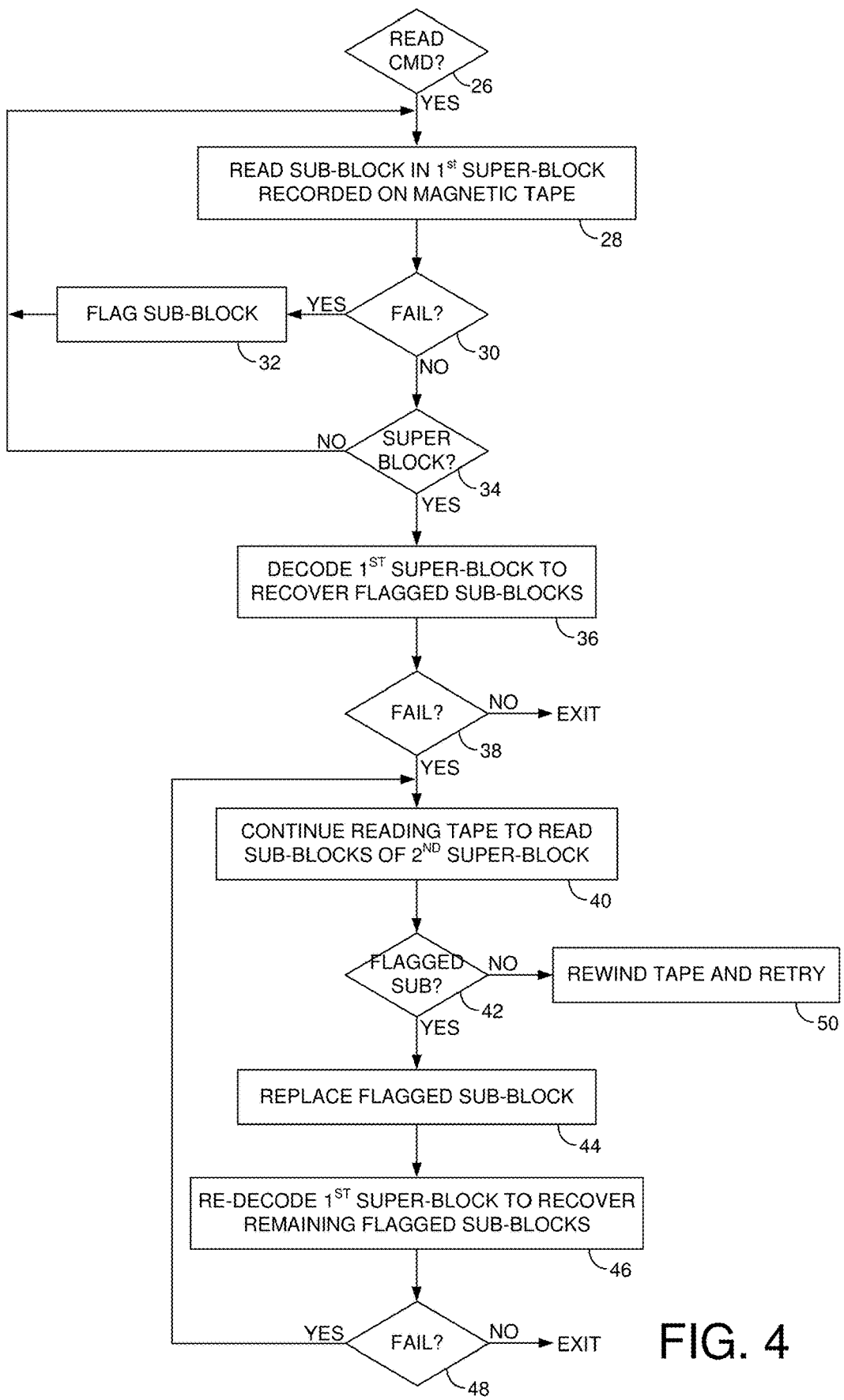
FIG. 4 is a flow diagram according to an embodiment wherein when an ECC sub-block fails recovery during a read operation, it is presumed the failed ECC sub-block is duplicated in a downstream ECC super-block.

FIG. 4 is a flow diagram according to an embodiment wherein during a read operation (block 26) a first ECC super-block is read from the magnetic tape including a first ECC sub-block (block 28). When the first ECC sub-block fails to decode at the sub-block level (block 30), the ECC sub-block is flagged (block 32). When all of the ECC sub-blocks of an ECC super-block have been read (block 34), the first ECC super-block is decoded (block 36) in order to recover the ECC sub-blocks that were flagged at block 32. When the first ECC super-block fails to recover the ECC sub-blocks (block 38), such as failing to recover the first ECC sub-block, the control circuitry 6 presumes that during the write operation the first ECC sub-block was duplicated downstream in a second ECC super-block as described above. Accordingly, the control circuitry 6 continues reading the magnetic tape (block 40) in order to read at least part of a second ECC super-block. When a copy of the first ECC sub-block is detected in the second ECC super-block (block 42), the copy of the first ECC sub-block in the decoded second ECC super-block is used in any suitable manner, such as to generate the data stream transferred to the host for the read operation. In the flow diagram of FIG. 4, the copy of the first ECC sub-block recovered from the second ECC super-block may replace the ECC sub-block in the first ECC super-block in order to decode the first ECC super-block, including any remaining unrecovered ECC sub-blocks (block 46). When the decoding of the first ECC super-block fails (block 48), the flow diagram continues from block 40 in order to read additional ECC sub-blocks from the second ECC super-block. When all of the ECC sub-blocks in the second ECC super-block have been read without finding any further copies of ECC sub-blocks (block 42), the control circuitry 6 executes a retry read of the first ECC super-block (block 50) which may include rewinding the magnetic tape in order to reposition the head at the beginning of the first ECC super-block. That is if a recovery attempt of the first ECC super-block fails using copies of ECC sub-blocks recorded downstream, the control circuitry 6 may resort to a more time consuming heroic error recovery procedure in order to recover the first ECC super-block.

In the embodiments described above, an ECC sub-block that fails a write-verify operation while writing a first ECC super-block may be duplicated in a second, downstream ECC super-block. In one embodiment, an ECC sub-block that fails the write-verify may be encoded into the second ECC super-block without re-encoding the host data into the ECC sub-block. In another embodiment, when encoding the second ECC super-block all of the corresponding host data may be encoded into the respective ECC sub-blocks, including to re-encode any ECC sub-block(s) that failed the write-verify operation. This latter embodiment may simplify the implementation by maintaining a more consistent ECC encoding procedure but may also increase the buffering of the host data.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device, comprising:
at least one head configured to access a magnetic tape; and
control circuitry configured to:
   read a first sub-block in a first super block recorded on the magnetic tape;
   determine that reading the first sub-block failed;
   decode the first super block;
   determine that the decoding failed;
   read a second sub-block in a second super block;
   replace first sub-block with second sub-block; and
   decode the first super block.

2. The data storage device of claim 1, wherein the control circuitry is further configured to: flag the first sub-block prior to decoding the first super block.

3. The data storage device of claim 1, wherein the second sub-block is disposed further down the magnetic tape.

4. The data storage device of claim 1, wherein the first sub-block comprises data and error correction code (ECC).

5. The data storage device of claim 4, wherein the ECC comprises ECC symbols.

6. The data storage device of claim 5, wherein the ECC symbols are a low density parity check (LDPC) code.

7. The data storage device of claim 1, wherein the first super block comprises a plurality of sub-blocks.

8. The data storage device of claim 7, wherein the first super block comprises a super block error correction code (ECC).

9. The data storage device of claim 8, wherein the super block ECC comprises ECC symbols for decoding the first super block.

10. The data storage device of claim 1, further comprising a single reel, wherein the magnetic tape is configured to move upon rotation of the single reel.

11. The data storage device of claim 1, further comprising dual reels, wherein the magnetic tape is configured to move upon rotation of the dual reels.

12. A data storage device, comprising:
at least one head configured to access a magnetic tape; and
control circuitry configured to:
   encode first data into a first super block;
   write verify the first super block; and
   encode the first data into a second super block, wherein the control circuitry is further configured to feed back the first data from the second super block to the first super block upon determining that the first super block cannot be read.

13. A data storage device, comprising:
at least one head configured to access a magnetic tape; and
control circuitry configured to:
   encode first data into a first super block;
   write verify the first super block; and
   encode the first data into a second super block, wherein the control circuitry is further configured to feed forward the first data from the first super block to the second super block upon determining that the second super block cannot be read.

14. A data storage device, comprising:
at least one head configured to access a magnetic tape; and
control circuitry configured to:
   encode first data into a first super block;
   write verify the first super block; and
   encode the first data into a second super block, wherein encoding the first data into the first super block comprises encoding the first data and error correction code (ECC) corresponding to the first data into the first super block.

15. A data storage device, comprising:
at least one head configured to access a magnetic tape; and
control circuitry configured to:
   encode first data into a first super block;
   write verify the first super block; and
   encode the first data into a second super block, wherein the control circuitry is further configured to determine the write verify failed prior to encoding the first data into the second super block.

16. A data storage device, comprising:
at least one head configured to access a magnetic tape; and
control circuitry configured to:
   encode first data into a first super block;
   write verify the first super block; and
   encode the first data into a second super block, wherein the control circuitry is further configured to encode second data into the first super block, wherein the first data in the first super block is separated from the second data in the first super block by error correction code (ECC) corresponding to the first data.

17. A data storage device, comprising:
magnetic tape means; and
control circuity configured to:
   fail to decode a first super block;
   read a sub-block of a second super block, wherein the sub-block is also present in the first super block;
   replace corresponding sub-block of first super block with the sub-block; and
   decode the first super block.

18. The data storage device of claim 17, wherein the corresponding sub-block is configured to contain the same data as the sub-block prior to being replaced.

* * * * *